(12) United States Patent
Puppi et al.

(10) Patent No.: US 11,912,075 B2
(45) Date of Patent: Feb. 27, 2024

(54) TYRE COMPRISING A MONITORING DEVICE

(71) Applicant: Pirelli Tyre S.p.A., Milan (IT)

(72) Inventors: Cristiano Puppi, Milan (IT); Andrea Natta, Milan (IT); Ivan Gildo Boscaino, Milan (IT); Jan-Eric Jack Martijn Rubingh, Geldrop (NL)

(73) Assignee: PIRELLI TYRE S.p.A., Milan (IT)

( * ) Notice: Subject to any disclaimer, the term of this patent is extended or adjusted under 35 U.S.C. 154(b) by 435 days.

(21) Appl. No.: 17/311,027

(22) PCT Filed: Dec. 16, 2019

(86) PCT No.: PCT/IT2019/050271
§ 371 (c)(1),
(2) Date: Jun. 4, 2021

(87) PCT Pub. No.: WO2020/129104
PCT Pub. Date: Jun. 25, 2020

(65) Prior Publication Data
US 2022/0016944 A1    Jan. 20, 2022

(30) Foreign Application Priority Data
Dec. 20, 2018   (IT) .................. 102018000020335

(51) Int. Cl.
*B60C 23/00* (2006.01)
*B60C 23/04* (2006.01)
*B60C 23/20* (2006.01)
(52) U.S. Cl.
CPC ...... *B60C 23/0493* (2013.01); *B60C 23/0488* (2013.01); *B60C 23/20* (2013.01)
(58) Field of Classification Search
CPC ............... B60C 23/0491; B60C 23/0493
See application file for complete search history.

(56) References Cited

U.S. PATENT DOCUMENTS

| 4,862,486 A | 8/1989 | Wing et al. |
| 5,749,984 A | 5/1998 | Frey et al. |
| 5,960,844 A | 10/1999 | Hamaya |
| 5,977,870 A | 11/1999 | Rensel et al. |

(Continued)

FOREIGN PATENT DOCUMENTS

| CN | 101155702 A | 4/2008 |
| CN | 105082901 A | 11/2015 |

(Continued)

OTHER PUBLICATIONS

International Search Report form the European Patent Office in corresponding International Application No. PCT/IT2019/050271 dated Mar. 27, 2020.

(Continued)

*Primary Examiner* — Justin R Fischer
(74) *Attorney, Agent, or Firm* — Finnegan, Henderson, Farabow, Garrett & Dunner, L.L.P.

(57) ABSTRACT

Tyre (1) comprising a monitoring device (10) comprising an electronic unit (11) comprising a sensor for detecting at least one of the following physical quantities: temperature, pressure, acceleration, deformation; a processing unit; a transceiver; an electric power supplier (12) having a housing body (50), a first pole (22) and a second pole (24); an electric circuit (18) for connecting the two poles (22, 24) to the electronic unit (11); a flexible support (13) on which the electronic unit is fixed (11), wherein the housing body (50) is fixed onto the flexible support (13) at a first face (23), wherein the monitoring device (10) comprises a tab (26) integral with the flexible support (13) and folded so that a portion (27) of the tab is fixed to a second face (25) of the housing body (50), and wherein the electric circuit (18) comprises a connecting track (28) extending along the tab (26) up to electrically contact the second pole (24).

19 Claims, 4 Drawing Sheets

(56) References Cited

U.S. PATENT DOCUMENTS

| | | |
|---|---|---|
| 2004/0066083 A1 | 4/2004 | Tsihlas |
| 2006/0220816 A1 | 10/2006 | Scheungraber et al. |
| 2007/0013503 A1 | 1/2007 | Chien et al. |
| 2008/0303634 A1 | 12/2008 | Toyofuku et al. |
| 2009/0115591 A1 | 5/2009 | Mancosu et al. |
| 2009/0134710 A1 | 5/2009 | Tyndall et al. |
| 2009/0320580 A1 | 12/2009 | Mancosu et al. |
| 2010/0007477 A1 | 1/2010 | Wilson et al. |
| 2010/0097662 A1 | 4/2010 | Churilla et al. |
| 2012/0325383 A1 | 12/2012 | Moore et al. |
| 2013/0125640 A1* | 5/2013 | Kempf ............... B60C 23/0496 73/146.8 |
| 2014/0118134 A1 | 5/2014 | Won |
| 2017/0001483 A1 | 1/2017 | Sabatini et al. |
| 2019/0322143 A1 | 10/2019 | Sabatini et al. |

FOREIGN PATENT DOCUMENTS

| | | |
|---|---|---|
| CN | 107539040 A | 1/2018 |
| DE | 20 2005 005144 U1 | 6/2005 |
| DE | 10 2012 007071 A1 | 10/2013 |
| FR | 2912235 A1 | 8/2008 |
| RU | 182706 U1 | 8/2018 |
| WO | WO 2007/000781 A1 | 1/2007 |
| WO | WO 2007/048621 A1 | 5/2007 |
| WO | WO 2007/121768 A1 | 11/2007 |
| WO | WO 2009/037178 A1 | 3/2009 |
| WO | WO 2013/098711 A1 | 7/2013 |
| WO | WO 2013/098712 A1 | 7/2013 |
| WO | WO 2015/144770 A1 | 10/2015 |
| WO | WO 2018/065846 A1 | 4/2018 |

OTHER PUBLICATIONS

Written Opinion of the International Searching Authority from the European Patent Office in corresponding International Application No. PCT/IT2019/050271 dated Mar. 27, 2020.

Notification of the First Office Action dated Dec. 27, 2021, from China National Intellectual Property Administration in counterpart Chinese Application No. 201980080320.3.

* cited by examiner

TYRE COMPRISING A MONITORING DEVICE

This application is a national stage filing under 35 U.S.C. § 371 of International Application No. PCT/IT2019/050571, filed on Dec. 16, 2019, which claims the benefit of priority to Italian Priority Application 102018000020335, filed Dec. 20, 2018; the disclosure of each of these applications are each incorporated herein by reference in their entirety.

TECHNICAL FIELD OF THE INVENTION

The present invention relates to a tyre comprising a monitoring device, for example suitable for monitoring at least one physical quantities among temperature, pressure, deformation, acceleration.

STATE OF THE ART

Typically a tyre has a substantially toroidal structure around an axis of rotation thereof during operation, and it has an equatorial plane perpendicular to the axis of rotation, said equatorial plane being typically a plane of (substantial) geometric symmetry (e.g. ignoring any minor asymmetries, such as the tread design and/or the writing on the sides and/or structure or profile asymmetries).

With "inner cavity" it is meant the space delimited by the inner surface of tyre and by the surface of the rim facing towards the inner surface of the tyre, when mounted.

With "crown portion" it is meant the portion of tyre placed at the tread band.

The terms "radial" and "axial" are used with reference respectively to a perpendicular direction and to parallel direction to the rotation axis of the tyre.

The term "tangential" is used with reference to a direction generally faced according to the rolling direction of the tyre, perpendicular to both the radial direction and the axial direction.

With "footprint" it is meant the portion of outer surface of the tread band which, during the rolling of the tyre mounted and subjected to a load (for example due to effect of the mounting on a vehicle), is in contact at every moment with the rolling surface.

The footprint typically has a substantially null curvature (or substantially infinite curvature radius), or in every case it substantially assumes the conformation of the rolling surface.

There have been proposed tyres for vehicles comprising monitoring devices of one or more physical quantities arranged in the inner cavity of the tyre, for example as described in US 2014/0118134 A1; U.S. Pat. Nos. 4,862,486; 5,749,984; 5,960,844; 5,977,870; US 2008/0303634 A1; US 2009/0134710 A1; US 2010/0007477 A1, DE102012007071 A1, WO2007/121768 A1, WO2007/048621 A1, WO2013/098711 A1, WO2013/098712 A1, WO2018/065846 A1, US 2007/0013503 A1, US 2010/0097662 A1.

SUMMARY OF THE INVENTION

In the context of tyres comprising monitoring devices arranged in the inner cavity of the tyre, the Applicant has made the following considerations.

It is preferable to detect the desired physical quantity, in particular the temperature, the deformation or the acceleration, directly onto the, or near to the, inner surface of the tyre at its crown portion. For example, it is preferable to acquire the temperature near to the inner surface of the crown portion, since in this way it is substantially acquired the actual temperature of the tyre material in the area in which the stresses, which tend to heat the tyre during the rolling, develop. On the contrary, the temperature for example near to the rim or the temperature of the fluid in the inner cavity can be very different from the temperature of the inner surface of the crown portion. Moreover, when the temperature is acquired, for example near to the rim or to the inflation valve, the data measured is influenced by the temperature of the environment outside the wheel due to the heat conduction and/or the presence of external heat sources such as air flows from the radiators or the brake discs.

In the case of the acceleration or of the deformation, it is preferable a direct measurement of at least one of the radial, tangential and axial components of the acceleration or of the deformation undergone by an arbitrary point located onto the inner surface of the crown portion which is subjected to stress and deformation due to the cycle of entry and exit from the footprint, or more generally from the interaction between the tyre and the rolling surface. In this way it is possible to obtain from the detected acceleration or deformation signal information about the status and/or instantaneous behaviour of the tyre during use (e.g. size of the footprint, wear, aquaplaning, slippage, etc.). Therefore it is desirable to apply the acceleration and/or deformation sensor, or sensors, to a point close to where the greatest stresses are generated, i.e. close to the contact between the tyre and the rolling surface, such as typically a point on the inner surface of the crown portion placed for example in correspondence of the central rib arranged in the axially central region of the tread, or in any case in a point on the inner surface of the crown portion corresponding to the most stressed area (both mechanically and thermally) of the tread during the tyre rolling.

For the realization of the monitoring device a PCB ('Printed Circuit Board') technology is typically used, based on a rigid support, on which the circuit tracks (electrically conductive metal tracks) are printed and the electronic components are fixed through the respective electrical connections (e.g. "pin") by welding and, possibly, adhesives. In this way the electrical and mechanical connections between the various electrical and electronic components and the rigid support are realized. Typically, the rigid support (PCB) comprises one or more layers of a base material, such as glass fibre, impregnated with a resin (e.g. epoxy).

However, the use of this technology involves a non-negligible weight of the rigid support itself, as well as a concentration of the mass of the rigid support and of the components welded on it at a point located on the tyre.

Furthermore, for the operation of the monitoring device it is usual to provide an electric power supplier comprising at least an electric power accumulator. For example, typically a battery (e.g. coin cell) comprising a metal capsule is used. This electric power accumulator typically has a significant weight. For example, a non-rechargeable coin cell battery of the CR2032 type, with an electric charge of about 200-250 mAh, can have a mass of about 3 g.

The prevalent tendency is to make the overall monitoring device as compact as possible. For example, a used solution envisages to superimpose on each other, appropriately connected, an accumulator and the PCB rigid support with all the electronic components fixed on it, and to encapsulate the whole with an encapsulating material (e.g. polymeric resin), possibly inside a rigid containment body. Furthermore, a housing can be provided (for example made of elastomeric material) to couple the device to the tyre surface by means of an attachment patch and/or one or more adhesives. These structures as a whole (containment body, encapsulant, housing, adhesive/s) entails a further increase in weight, for a total overall weight of the entire monitoring device which can reach 8-15 g, almost all located in a small area, equal to the plant area of the container (for example, inscribed in a circle with diameter of 18-30 mm).

The Applicant, in conducting tests at very high tyre rotation speeds (corresponding to extreme linear speeds of a corresponding vehicle, for example over 300 km/h) has verified that the location of the aforesaid overall mass generates very intense stresses (in particular radial and tangential stresses).

In fact, in the areas of entry and exit from the footprint, due to the corresponding deformation undergone by the tyre, the radial acceleration is greater than in the areas outside the footprint. From experimental measurements, carried out by the Applicant at different speeds, the maximum acceleration at the entrance and exit of the footprint is about 1.5 times the radial acceleration outside the footprint. Moreover, in the footprint area, while the radial acceleration becomes zero, a tangential acceleration appears which follows, along the footprint, a trend similar to a sinusoid, whose amplitude has been experimentally determined by the Applicant to be equal to about the half of the radial acceleration at the footprint entry/exit.

According to the Applicant, the acceleration with its rapid and intense variation at high-frequency cycles generates significant cyclic stresses, in radial direction (such as a 'hammering') and in tangential direction (shear), caused by the device on the tyre structures and/or vice-versa. At the aforementioned extreme speeds, these stresses have as a direct consequence a significant and localized overheating of the accumulator and/or of the monitoring device and/or of the tyre at the point of application of the monitoring device. Said overheating can significantly distort the reading of the correct operating temperature of the tyre by the monitoring device. Furthermore, said overheating and said mechanical stress and/or the combination of the two effects can lead to a damaging of the accumulator and/or of the monitoring device, relatively to their structural and/or functional integrity, and/or to their coupling with the inner surface of the tyre (for example decomposition and/or detachment of the adhesive for applying the device to the inner surface). In more serious cases, said overheating and said mechanical stress and/or the combination of the two effects can lead to the loss of structural integrity of the crown portion of the tyre, even up to the formation of holes (so-called "blisters") at the tread band, caused by the localized decomposition of the tyre compound subsequently removed due to the rotational movement of the latter and/or to the delamination of the tread.

To mitigate this problem, the Applicant has devised a monitoring device which uses a flexible support onto which the different functional elements (electronic unit or parts thereof, accumulator/s, etc.) are fixed so that at least some of these components are not radially superimposed to each other. The flexible support allows the monitoring device to adapt to the deformation of the crown portion during rolling, in particular at the footprint. Moreover, this solution avoids the above described weight increase, given by the rigid PCB, by the containment body, by the encapsulant and by the housing, and it allows to distribute the weight of the different functional elements over several points of the inner surface of the tyre, with consequent mitigation of the hammering phenomenon. Last but not least, the flexible support, in particular if substantially inextensible, allows to distribute the stresses, in particular the shear stresses, on a wider area.

However, the Applicant has found that the fixing of each accumulator to the flexible support involves some problems.

Typically, in fact, an accumulator has a rigid containment body (typically in metal or in a hard polymer) and has a non-negligible concentrated mass.

The electric contact between the two poles of the accumulator and the electric circuit for the supplying of the electronic unit must be guaranteed for the entire life of the monitoring device. The Applicant has contemplated a solution in which two contact pins (called "tabs", e.g. made of metal), one for each pole, are fixed above and below the accumulator and connected to the circuit by a conducting adhesive. However, the Applicant has verified, also after high speed and/or fatigue tests, that this solution involves the detachment of one or both the pins from the electric circuit, caused by the detachment of the conducting adhesive from the tracks of the electric circuit and/or by the detachment of the assembly formed by adhesive and conducting tracks from the flexible support, thus interrupting the electric continuity between the accumulator and the electric circuit.

According to the Applicant this phenomenon is due to the above described stress cycles, as well as to the inertia of the device and, in particular, of the accumulator itself, which produce micro-movements (vibrations) in radial and/or shear direction of the assembly accumulator/pin, which is substantially rigid and relatively free, with respect to the flexible support, which instead is relatively constrained due to its close adhesion to the inner surface. Since the pins are rigid and integral with the accumulator, these micro-movements create a strong stress at the attachment point between pins and circuit tracks, which represents a weak point in the connection, subject to breakage.

The Applicant has further realized that, when a non-rechargeable energy accumulator such as the aforementioned coin batteries is used, it is desirable that this accumulator contains a sufficient amount of available energy for a period compatible with the life of the tyre (typically several years for devices intended for use on normal road vehicles).

The Applicant has found that the use of an accumulator with this amount of energy leads to an increase in the relative mass, with a consequent increase of the above described stresses and/or vibrations and exacerbation of the aforesaid relating problems.

The Applicant has therefore faced the problem of realizing a monitoring device of at least one physical quantity (for example temperature, and/or pressure and/or acceleration and/or deformation) to be applied directly in proximity of the inner surface of the crown portion of a tyre, able to avoid or to limit the localized overheating and the consequent risk of detecting an incorrect temperature value and/or of loss of structural integrity of the tyre and/or of the monitoring device, even at very high rotation speeds of the tyre, and even in face of the presence of one or more accumulators able to provide a significant pre-accumulation of electric energy, and which at the same time durably guarantees the supplying of the electronic unit.

According to the Applicant the aforesaid problem is solved by a monitoring device based on a flexible support in which at least one accumulator is fixed to the flexible support, wherein a tab of the flexible support is folded and glued on the accumulator.

According to an aspect the invention relates to a tyre comprising a monitoring device of one or more physical quantities correlated to a tyre (for example temperature, pressure, deformation and/or acceleration), fixed on an inner surface of said tyre, preferably at a crown portion of said tyre.

According to a further aspect, the invention relates to a monitoring device of one or more physical quantities correlated to a tyre (for example temperature, pressure, deformation and/or acceleration), fixable on an inner surface of a tyre, preferably at a crown portion of said tyre.

The monitoring device comprises an electronic unit and an electric power supplier comprising a housing body, a first pole at a first face of the housing body and a second pole at a second face of the housing body, opposite to the first face. The monitoring device comprises an electric circuit for connecting the two poles to said electronic unit.

The electronic unit comprises: at least one sensor for detecting at least one of the following physical quantities: temperature, pressure, acceleration, deformation; a processing unit; a transceiver.

The monitoring device further comprises a single piece flexible support, on which the electronic unit is fixed.

The housing body is fixed onto said flexible support at said first face.

Preferably the monitoring device comprises a tab integral with said flexible support at a first end of the tab and folded so that a portion of the tab is fixed to said second face of the housing body. Preferably the electric circuit comprises a connecting track extending along said tab up to electrically contact said second pole.

With 'electric power supplier' it is meant a component structured to supply electric power to the electronic unit, which can consist in one or more accumulators, wherein the power to be supplied is pre-accumulated (e.g. battery or electric capacitor), or it can contain a generator and/or receiver in situ of electric power suitable for directly supplying the electronic unit and/or for re-charging at least one accumulator (such as for example a power recovery device, or 'energy scavenging' or 'energy harvesting' device, or an electromagnetic induction charger). The electric power supplier comprises at least one housing body with two opposite faces at which there are electric poles for the supplying of the electric power. For example, in the case of an accumulator the housing body can encapsulate the anode, the cathode and the electrolyte, or in the case of a generator and/or in-situ electric power receiver the housing body can enclose a (e.g. piezoelectric or electromagnetic) device configured for obtaining electric power from an alternative power source such as, for example, thermal power, kinetic power, electromagnetic power, potential power. In both cases the electric power is supplied from the poles of the housing body towards an accumulator (in the case of the generator and/or receiver) and/or towards the electronic unit (both in the case of the accumulator and in the case of the generator and/or receiver).

According to the Applicant, the aforesaid tab performs the function of establishing an electric contact between the second pole (i.e. the free pole) arranged on the housing body of the electric power supplier and the rest of the electric circuit for supplying the electronic unit, in substitution of the rigid pins that generate the above explained stress points. Thanks to the flexibility of the tab, and therefore to its mobility, the tab can follow the above described micro-movements of the housing of the electric power supplier, avoiding the creation of stress points (in which an interruption of the connection could occur) along the electric connection track that extends along the tab itself.

The present invention, in one or more of the aforesaid aspects, can have one or more of the following preferred features.

Typically, the housing body is rigid, for example made of metal.

Preferably said electric power supplier comprises at least one accumulator comprising said housing body.

Preferably said tab forms a single body with said flexible support. In other words, said tab is integral part of the flexible support, developing with continuity from the flexible support at said first end. In this way the electric connection is robust and the making of the tab itself is simple and cheap, for example by (for example by laser) cut of the flexible support.

Preferably said tab (when extended in plant, i.e. before the folding) exceeds at least partially (an envelope of) a perimetral edge of the flexible support. In other words, the tab, before being folded on itself, at least partially protrudes from the plant encumbrance (or better from the envelope) of the flexible support. In this way the making of the tab does not mechanically weaken the rest of the flexible support and/or the plant encumbrance of the flexible support remains limited.

Preferably an attachment line of said tab to said flexible support is arranged in a rearward position with respect to (an envelope of) a perimetral edge of the flexible support. In other words, only a part of the tab exceeds the perimetral edge (or its envelope) of the flexible support. In this way the making of the tab requires for a limited excess of material with respect to a flexible support without tab. Moreover, in this way it is easy to make adhere the tab to the housing body along the whole extension of the tab.

Preferably said flexible support has discharge holes at opposite ends of an attachment line of the tab to the flexible support. In this way the risk that the flexible support tears at the ends of the attachment line is reduced.

Preferably said portion of tab fixed to said second face of the housing body is a free end portion of the tab. In this way overall length of the tab is maintained limited.

Preferably the monitoring device comprises an electrically conducting adhesive interposed between said connecting track and said second pole to make the electric contact between the connecting track and said second pole and to fix said portion of tab to said second face of the housing body, more preferably to said second pole. In this way the conducting adhesive ensures the electric conduction and it cooperates for the purpose of the fixing of the housing body.

Preferably said electrically conducting adhesive is at a sub-portion of said portion of the tab fixed to the second face of the housing body, more preferably said sub-portion being at an end portion of said connecting track.

Preferably the monitoring device comprises an electrically insulating adhesive for (furtherly) fixing said portion of tab to said second face of the housing body.

Preferably the electrically insulating adhesive extends on a further sub-portion of said portion of tab. In this way the insulating adhesive can be chosen for optimizing the robustness of the fixing of the tab to the second face, while allowing the electric contact.

Preferably the monitoring device comprises an electrically insulating adhesive for fixing a further portion of tab, interposed between said portion of tab and said first end of the tab (e.g. an attachment line of the tab to the flexible support), to said housing body, more preferably to a side wall of said housing body. In this way the insulating adhesive contributes to fix the housing body to the flexible support (in particular with respect to the shear stresses), moreover avoiding the electric contact between the connecting track and parts of the electric power supplier not attributable to the second pole.

Preferably said tab is fixed to the second face of the housing body to tightly enfold the housing body, more preferably remaining adherent to a side wall of said housing body (e.g. by means of the aforesaid insulating adhesive). Preferably said tab is subjected to a tension. In this way the tab also performs the function of contributing to mechanically fix the housing body to the flexible support. In fact, due to the concentrated weight, at the contact surface between the first face of the housing body and the flexible support, the aforesaid cyclic stresses are generated, in a radial direction ("hammering") and in a tangential direction (shear), which subject to fatigue the coupling between the two elements (for example by means of an adhesive), up to damaging it causing the partial or total detachment of the housing body. Furthermore, the repetition at high frequency of these stresses can cause a heating of the adhesive used for the coupling, which in turn can contribute and/or favour the aforesaid damage of the coupling.

Typically said electric circuit comprises at least a first electric path for the connection of said electronic unit to the first pole, e.g. the positive pole, and a second electric path for the connection of said electronic unit to the second pole, e.g. the negative pole. Preferably said electric connecting track belongs to the second electric path. Preferably the electric circuit comprises a first electric contact at, and in contact with, said first pole and belonging to the first electric path.

In one embodiment said first electric contact has a geometrically connected layout (i.e. without inner openings), such as for example a circle.

In one embodiment said first electric contact has a grid layout. In this way the conducting adhesive (and possibly the insulating adhesive) directly contacts the flexible support under the first electric contact, ensuring a greater robustness of the fixing of the housing body and/or a greater electric contact area (since also the side walls of the grid are wet by the conducting adhesive).

Preferably the monitoring device comprises a dielectric material layer (i.e. electrically insulating, for example a dielectric ink) which covers at least a portion of the connecting track, the dielectric material layer being preferably interposed (in contact) between said portion of the connecting track and said electrically insulating adhesive.

Preferably said portion of the connecting track extends at least at a side wall of said housing body and/or at a sub-portion of said portion of tab. Preferably said dielectric material layer covers said second electric path at the first face of the housing body. In this way the durability over time (for example with respect to the presence of the insulating adhesive alone) of the insulation between the first pole and the connecting track is improved, especially at regions of greater curvature of the tab.

Preferably the monitoring device comprises an electrically conducting adhesive for fixing said housing body on the flexible support, the electrically conducting adhesive being interposed in contact between the first pole and the first contact. In this way the conducting adhesive contributes to fix the housing body and at the same time it guarantees the electric contact.

Preferably the monitoring device comprises an electrically insulating adhesive for fixing to said flexible support a portion of the first face of the housing body, more preferably an annular portion centred in said first contact. In this way the insulating adhesive contributes to fix the housing body to the flexible support, preferably avoiding any electric contact between the connecting track and parts of the electric power supplier not attributable to the second pole.

Preferably said electrically insulating adhesive extends (preferably with continuity) between said first face and said portion of tab. More preferably said electrically insulating adhesive extends with continuity from said first face up to said portion of tab. In this way the insulating effect is favoured.

Preferably said electrically conducting adhesive lies within said annular portion of the first face of the housing body. In this way the whole first face has the adhesive.

Preferably said electrically insulating adhesive is a pressure sensitive adhesive and/or an epoxy adhesive. Preferably said electrically conducting adhesive is a double-adhesive tape, e.g. pressure sensitive.

Preferably the electric circuit is (directly) fixed onto said flexible support.

Preferably said electric circuit is printed onto said flexible support with a conducting ink (for example silver based), even more preferably printed by screen printing technology. In one embodiment the electric circuit comprises conducting tracks, including the electrical conducting track, made of copper, preferably obtained by chemical etching of a thin (e.g. a few microns or a few tens of microns) copper layer. These printing technologies has proved to be particularly suitable to the flexible support and able to make the conducting track resistant to the flexures.

Preferably said accumulator is an electric battery (for example a coin battery), more preferably non-rechargeable.

Preferably said housing body has circular plant.

Preferably said accumulator has a charge capacity greater than or equal to 30 mAh, more preferably greater than or equal to 80 mAh, even more preferably greater than or equal to 100 mAh.

Typically, said accumulator has a weight greater than or equal to about 0.5 g, more preferably greater than or equal to about 1 g. Preferably said accumulator has a weight lower than or equal to about 4 g. For uses on tyre suitable for heavy loads (such as tyre for SUV, CUV, truck, bus, etc.) batteries of greater weight can be used, till about 7-8 g.

Preferably said housing body is inscribed in a circle having diameter lower than or equal to 30 mm, more preferably lower than or equal to 25 mm, and/or circumscribed to a circle having diameter greater than or equal to 15 mm, more preferably greater than or equal to 17 mm.

These types of accumulators are able to supply sufficient power for the operation of the device even over periods compatible with the average life of a, and/or even in the presence of complex device functionalities, such as detecting of different parameters such as acceleration, one or more dimensions of the footprint area, the vertical load, etc.

Preferably said accumulator is structured to resist to temperatures greater than or equal to 100° C., more preferably greater than or equal to 110° C. In this way the accumulator resists to the overheating temperatures of the tyres.

Preferably said electric power supplier comprises a plurality of housing bodies, each housing body having one or more of the features above described for said housing body.

Preferably the monitoring device comprises a respective tab for each housing body, wherein the monitoring device has, for each respective tab, one or more of the features above described for said tab.

Preferably said electric power supplier comprises a plurality of electric energy accumulators, each accumulator being electrically connected to said electronic unit through said electric circuit and suitable for supplying said electronic unit, wherein each of said accumulators has one or more of the features above described for said at least one accumulator.

The plurality of electrical energy accumulators distinct from each other and fixed onto the flexible support allows that the accumulators are not—even partially—mutually radially superimposed. They are also not radially superimposed to the electronic unit—not even partially—with the electronic unit fixed on the flexible support. This solution allows the overall mass of the power supplier to be subdivided into at least two parts (the accumulators), each part having a non-negligible mass with respect to the overall mass of the device. In this way it is reduced the mass which insists on a respective single localized crown portion of the tyre, together with the consequent aforesaid hammering and shearing stress phenomenon: this implies a reduction in the consequent overheating of the crown portion and/or of the adhesive and/or monitoring device. All in face of a high overall capacity of electric energy storage, given by the sum of the individual capacities of each accumulator.

Preferably said accumulators are electrically connected to said electronic unit in parallel. In this way the capacity of the accumulators is summed, thus being able to obtain a significant duration of the monitoring device and/or an increment in the monitoring functions.

Preferably the equatorial plane of the tyre crosses said monitoring device, more preferably it crosses said electronic unit, for example at said sensor. In this way the device (preferably the sensor) is applied to a portion of the tyre subjected to the greatest stresses and—therefore—of greater interest in the case of signal measurements (e.g. accelerometers) from which information about the status and/or on the instantaneous behaviour of the tyre during the use is to be detected.

Preferably said at least one sensor is suitable for detecting at least two of the following physical quantities: temperature, pressure, deformation, acceleration, for example temperature and pressure. Even more preferably said at least one sensor is suitable for detecting at least three of, or all four, said physical quantities. Preferably said at least one sensor is suitable for detecting at least said acceleration and/or said deformation, more preferably at least a radial and/or a tangential component of said acceleration and/or of said deformation. In this way the monitoring device provides particularly useful data for obtaining the status and/or the operation of the tyre, and/or the behaviour of the vehicle on which it is mounted.

Preferably said flexible support is fixed to the inner surface of said tyre by means of an adhesive layer (e.g. a pressure sensitive adhesive).

Preferably said flexible support is substantially inextensible. In this way the shear stresses are distributed and/or the stresses on the tracks of the connection circuit are limited.

For the purposes of the present description and of the claims which follow, with "flexible support" it is generally meant a support made of a material (including a composite/layers material) which, if used for making a square-shaped plate with edge significantly greater than the circumferential extension of the area of entry or exit from the footprint region of a tyre (for example a 120 mm×120 mm surface plate) and with thickness equal to the support, allows this plate to conform—at room temperature—to a cylindrical surface with radius smaller than the normal curvature radius of a tyre inflated to its nominal pressure (for example a cylindrical surface with radius 200 mm, preferably 100 mm, more preferably 50 mm) without breaking or undergoing a permanent deformation.

For the purposes of the present description and of the claims which follow, with "non extensible support" it is generally meant a support with a thickness from about 10 µm to about 400 µm, preferably from about 50 µm to about 200 µm, made of a material (including a composite/layers material) having traction elastic modulus preferably greater than 0.1 GPa, more preferably greater than 0.5 GPa at 23° C.

Preferably said flexible support is a film of an elastomeric or thermoplastic material selected from the following group: nylon, PET, PEN, polyimide, EPDM, diene polymers and polyurethane resins. Paper substrates, thin sheets in epoxy resin (possibly reinforced, for example with glass fibres) or super-thin and therefore flexible sheets of silicon (or another semiconductor) can also be used. These flexible supports have proved to be suitable for technologies in which the electric connection circuit is printed or deposited onto the support or chemically etched, and the pre-fabricated electronic components are fixed and electrically connected to the electric connection circuit by bonding with conductive adhesives and/or by welding, for example with tin or its alloys (for example tin-bismuth) or adhesives loaded with conductive particles (such as silver, copper or carbon particles).

Preferably at least two between said sensor, said processing unit and said transceiver, more preferably all three, are arranged in a single, preferably pre-fabricated, assembly (for example by means of a respective containing body which at least partially houses said at least two between said sensor, said processing unit and said transceiver). In this way the making of the monitoring device is considerably simplified.

Preferably said plurality of accumulators comprises a first and a second accumulator arranged at opposite sides of said electronic unit. By interposing the electronic unit between the two accumulators, the latter are placed at a greater mutual distance than a placement on a same side of the electronic unit, with the same overall plant encumbrance of the monitoring device. In this way, the phenomenon of sum of the heating effects of the two single accumulators is avoided or further limited, together with consequent overheating (in particular at the most stressed regions of the tread of the tyre, such as for example the central relief).

Preferably said plurality of accumulators comprises two and no more than two accumulators arranged at opposite ends of the monitoring device along a main development direction. In this case, the overall plant encumbrance and the complexity of the monitoring device are limited.

Preferably the monitoring device comprises a polymeric film applied adherently to a face of said monitoring device on the side of said electric power supplier (i.e. opposite to the inner surface of the tyre). Preferably said polymeric film completely covers said face of the monitoring device. Preferably said polymeric film is made of polyurethane. Preferably said film is applied to said face by lamination. In this way, in addition to protecting all the exposed part of the device from hits, chemical agents and/or dirt, the film contributes to fix the different electronic components to the flexible support, including the electric power supplier/the accumulators.

Preferably said tab has an overall length along a main extension line (for example from said first end, e.g. the attachment line, to a second end opposite to the first end) such that it extends over a whole side wall of said housing body and furthermore for at least 50% of a respective dimension of said second face of the housing body (for example a diameter of said second face), preferably for not more than 90% of said respective dimension of the second face, more preferably for not more than 80% of said respective dimension. In this way it is possible to fold the tab on itself and to make the electric contact with the second pole.

Preferably said tab has a width along a direction (locally) perpendicular to said main extension line greater than or equal to 25%, more preferably greater than or equal to 30%, of said respective dimension of the second face, and/or equal to said respective dimension of the second face, more preferably less than or equal to 80%, even more preferably less than or equal to 60%, of the respective dimension of the second face.

These dimensions have proved to be particularly suitable for establishing an adequate fixing of the battery, a stable and long-lasting electric contact of the second pole, while limiting at the same time the risks of undesired electric contact with the first pole.

BRIEF DESCRIPTION OF THE DRAWINGS

The features and the advantages of the present invention will be further clarified by the following detailed description of some embodiments, presented by way of non-limiting example of the present invention, with reference to the attached figures, in which.

DETAILED DESCRIPTION OF SOME EMBODIMENTS OF THE INVENTION

Figure 1:
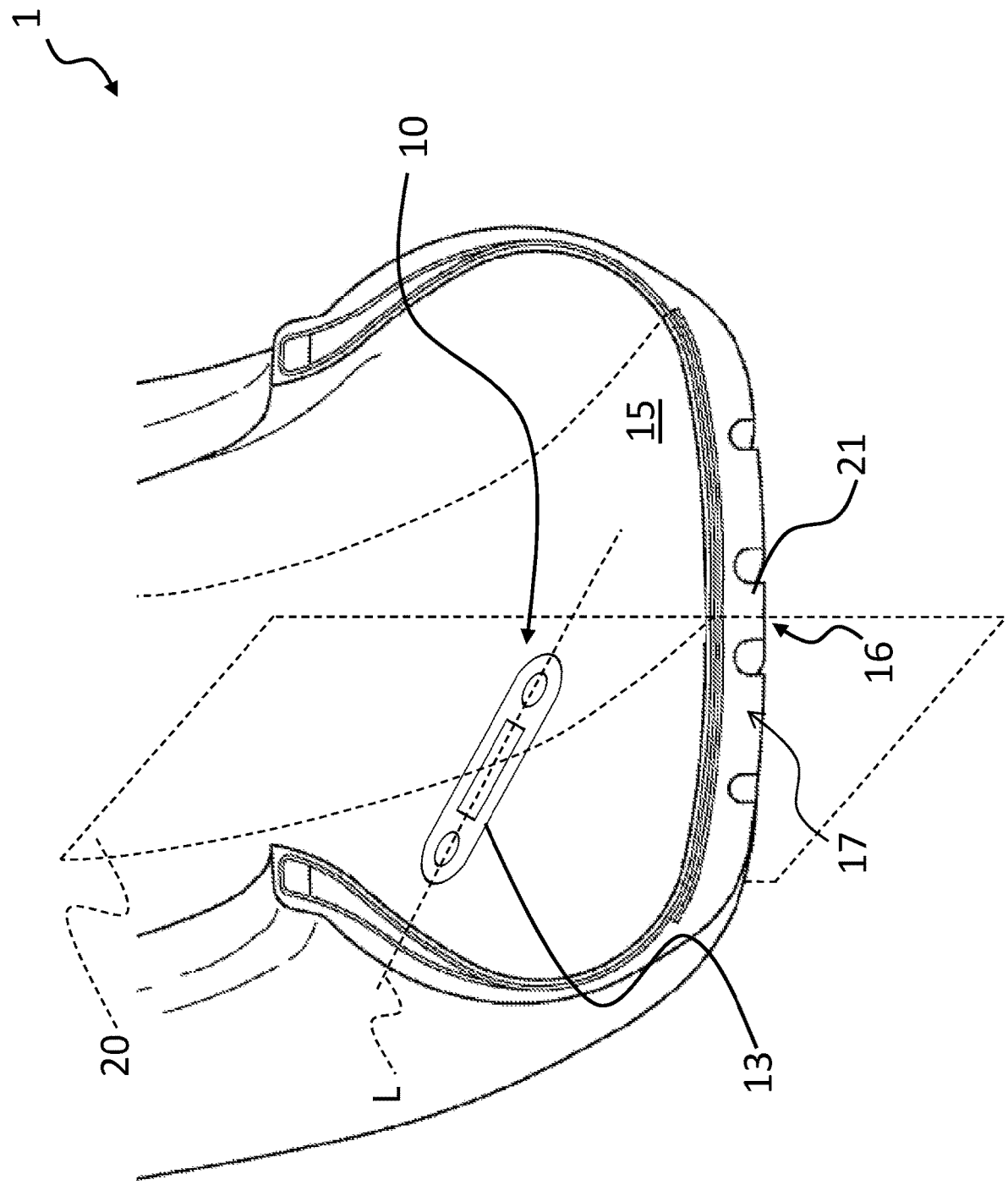
FIG. 1 shows a schematic, perspective and partial view of a section of tyre comprising a monitoring device according to the present invention.

In FIG. 1 with reference number 1 it is shown a tyre (in partial perspective section) comprising a monitoring device 10 according to the present invention. In the present description and figures the same reference number is used for the same elements, also in their embodiments.

The monitoring device 10 comprises an electronic unit 11 and an electric power supplier 12 comprising at least one accumulator 14 electrically connected with the electronic unit by means of an electric circuit 18.

Figure 2:
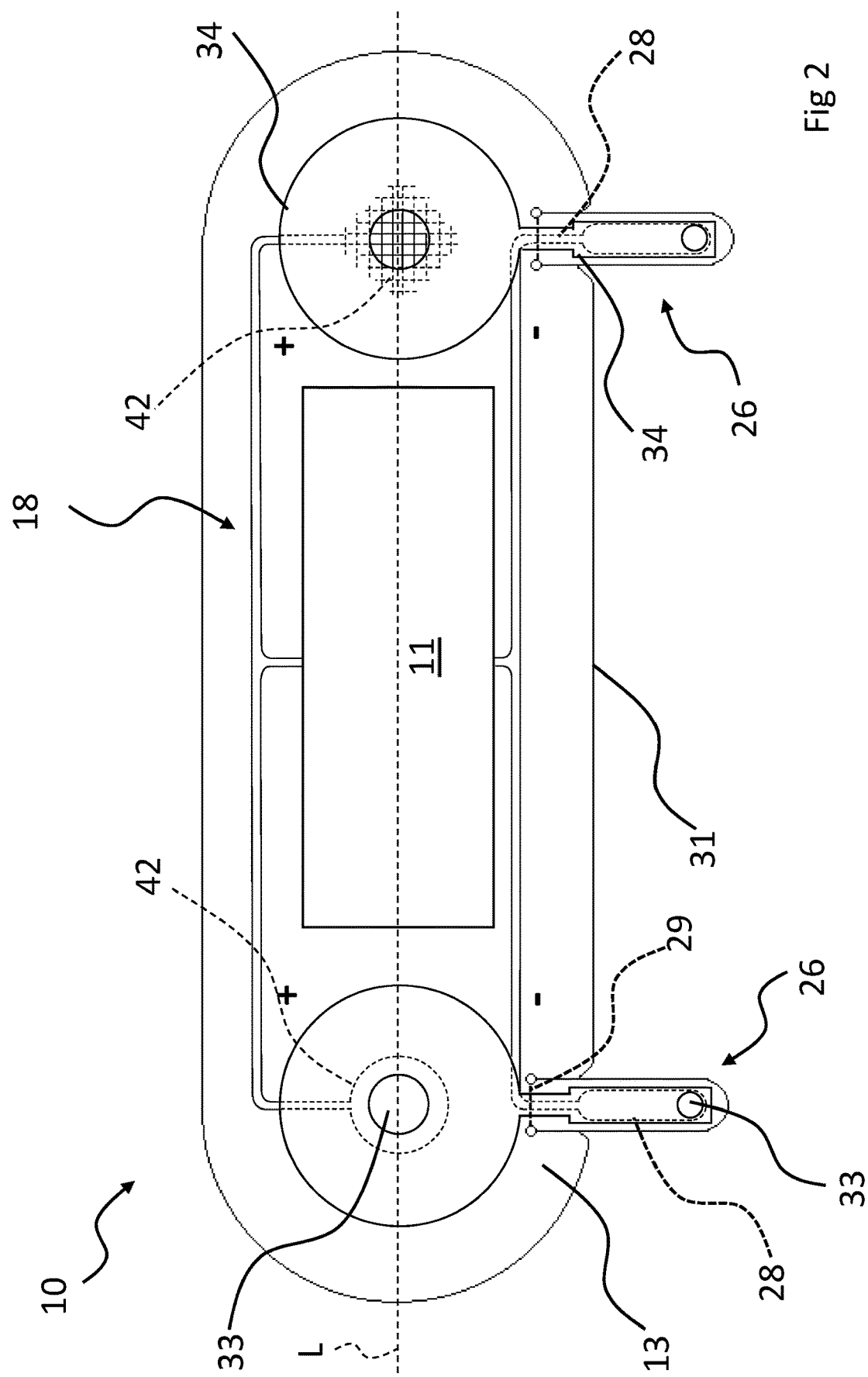
FIG. 2 shows a schematic and partial plant view of a monitoring device according to the present invention without the accumulators and with the tabs spread.
Figure 3:
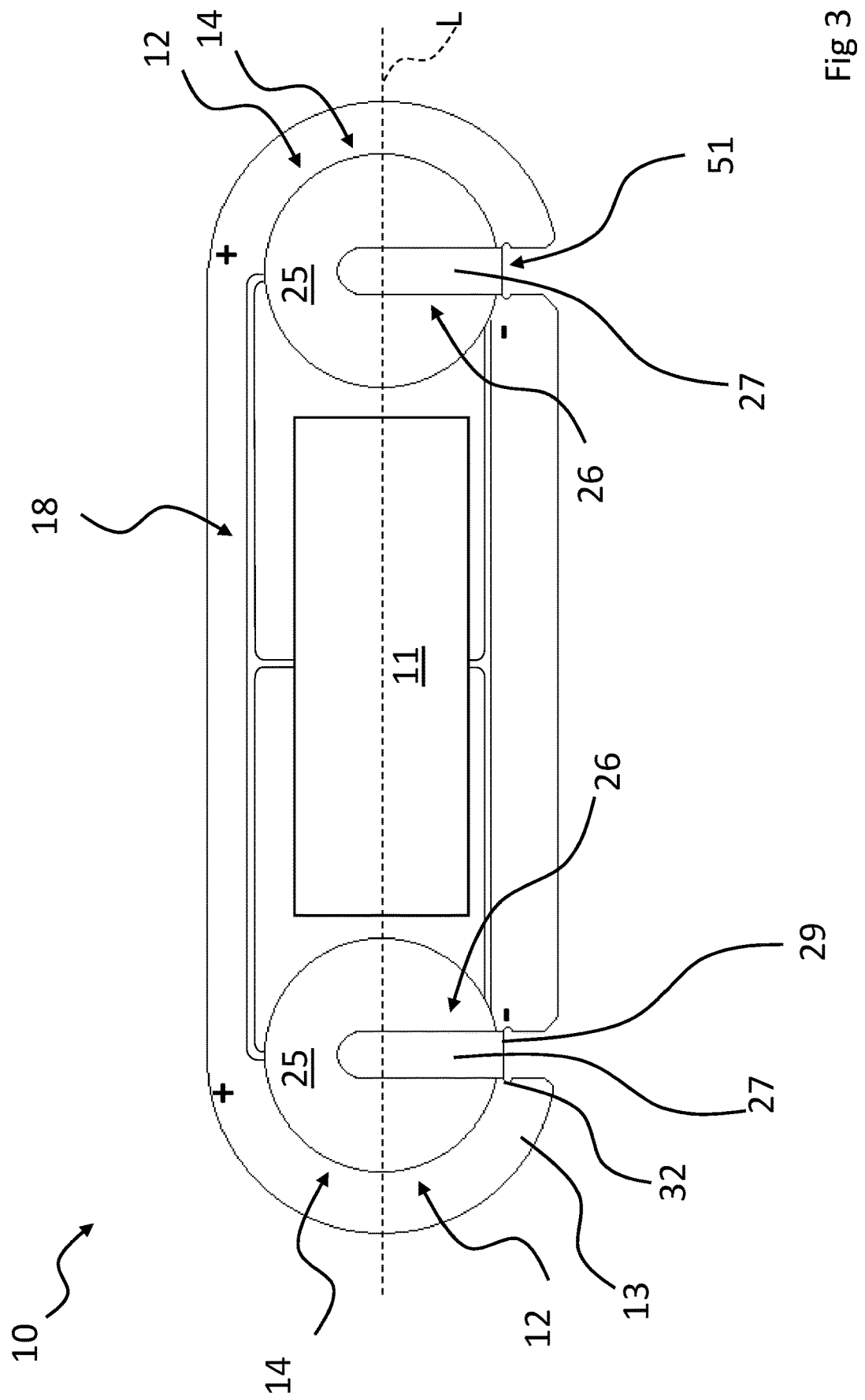
FIG. 3 shows a schematic and partial plant view of the monitoring device of FIG. 2 with the accumulators and with the tabs folded.

In the shown examples, the electric power supplier 12 comprises (for example consists of) a pair of electric energy accumulators 14, each accumulator 14 having a respective housing body 50 and being electrically connected to the electronic unit 11 by means of the electric circuit 18 for supplying the electronic unit, preferably in parallel (as exemplarily and schematically shown in FIGS. 2 and 3).

Each accumulator 14 comprises (FIG. 4) a first pole 22 at a first face 23 of the housing body 50 (the first pole being typically integral with the side wall 41 of the housing body) and a second pole 24 at a second face 25 of the housing body opposite to the first face 23, the electric circuit 18 connecting the two poles to the electronic unit.

The monitoring device 10 also comprises a flexible support 13 in single piece, fixed on an inner surface 15 of the tyre at a crown portion 16 of the tyre 1 (i.e. the portion of tyre at the tread band 17). Exemplarily the flexible support 13 is a polyimide film (e.g. Kapton® by DuPont®).

The electronic unit 11 is fixed on the flexible support 13. Each accumulator is also fixed on the flexible support 13 at the first face 23, and connected to the electric circuit 18, according to the present invention.

Figure 4:
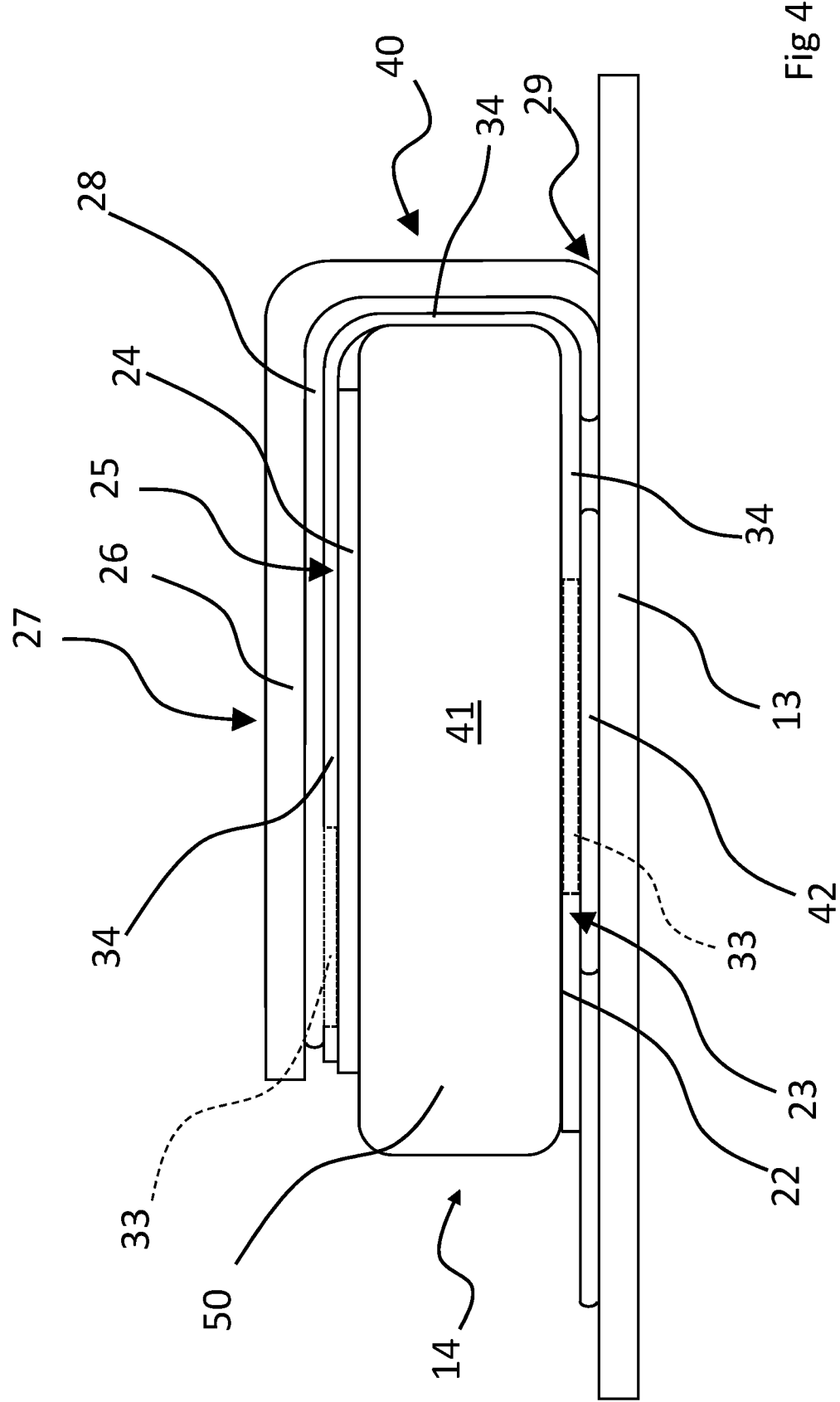
FIG. 4 shows a schematic and partial side view of a portion of the device of FIG. 3.

Preferably the two accumulators are arranged at opposite sides of the electronic unit 11, as exemplarily shown in FIGS. 3 and 4.

Exemplarily the monitoring device 10 has a plant (e.g. defined by the plant of the flexible support 13) with an elongated shape along a main development direction L, the two accumulators being arranged at opposite ends of the monitoring device (FIGS. 1 and 3). Exemplarily the dimensions along this direction L and along the dimension perpendicular to it (in the plane of FIGS. 2 and 3) are equal to 110×30 mm or 80×25 mm.

Typically, the electric circuit 18 comprises a first electric path for the connection of the electronic unit 11 to the first pole, exemplarily shown as the positive pole (although it may be the negative pole), and a second electric path for the connection to the second, e.g. negative, pole. Typically, the electric circuit 18 comprises a first electric contact 42 at the first pole 22 and belonging to the first electric path.

In FIG. 2 the electric circuit 18 is schematically shown only with reference to the elements relevant to the present description. Moreover, in FIG. 2 the two shown first electric contacts 42 are different from each other for illustrative purposes. In one embodiment, exemplarily shown on the left, the first electric contact 42 has a circular layout, while in a different embodiment, exemplarily shown on the right, the first electric contact 42 has a grid layout. A real device 10 will typically have the two first electric contacts 42 equal to each other (not shown).

Exemplarily each accumulator 14 is an electric battery, for example a coin battery of the type CR2032HR sold by Maxell® (capacity 200 mAh, weight 3 g, diameter and thickness 20×3.2 mm), or BR1632 marketed by Panasonic® (capacity 120 mAh, 1.5 g, 16×3.2 mm) or BR 1225 marketed by Panasonic® (capacity 48 mAh, 0.8 g, 12.5×2.5 mm). The typical voltage is equal to 3V, and the operating range of temperature from −40+125° C.

According to the present invention, the flexible support 13 comprises, for each accumulator 14, a tab 26 folded so that a portion 27 of the tab is fixed to the second face 25 of the accumulator. Preferably the electric circuit 18 comprises, for each accumulator 14, a connecting track 28 (exemplarily shown in FIG. 2 in dashed lines, since it is under the insulating adhesive) which extends along the tab 26 up to contact the second pole 24. The electrical connecting track 28 belongs to the second path.

In the shown examples, the tab 26 forms a single body with the flexible support 13, protruding from the latter from an attachment line 29 (arbitrarily shown in dashed lines in FIG. 2) of the tab, placed at a first end 51 of the tab, and being folded on itself to enfold the housing body 50. In alternative embodiments (not shown) the tab can be an element distinct from the flexible support and made integral with the flexible support (for example by gluing) at least at a first end.

Preferably the tab 26 (when extended in plant view, i.e. before the folding, as shown in FIG. 2) partially exceeds the envelope of the perimetral edge 31 of the flexible support 13. Preferably an attachment line 29 (arbitrarily shown in dashed lines in FIG. 2) of the tab to the flexible support 13 is arranged in a rearward position with respect to the envelope of the perimetral edge 31. As shown in FIG. 3, the tab is typically folded starting from the attachment line 29.

Preferably the flexible support 13 has discharge holes 32 at opposite ends of the attachment line 29.

Preferably the portion of tab 27 fixed to the second face of the accumulator is a free end portion of the tab. In not shown alternative embodiments, this portion fixed to the second face can be a middle portion of the tab. In other words, the tab is attached (for example in single body or glued) to the flexible support at both its ends, to form a bridge over the accumulator (for example the tab can be obtained with two parallel notches entirely contained within the perimetral edge 31 of the flexible support 13.

Exemplarily the tab has an overall length along the main extension line which goes from the attachment line 29 to the free end equal to the sum of the extension of the side wall 41 of the housing body 50 and of the 70% of the diameter of the second face 25. Preferably the tab has a width along the direction locally perpendicular to the main extension line equal to about 30% of the diameter of the second face 25.

Preferably the portion of tab 27 is fixed to the second face 25 of the accumulator, in particular to the second pole 24, by means of an electrically conducting adhesive 33 (shown in broken lines in FIG. 4 since covered by the insulating adhesive), isotropic (e.g. Henkel® 3104 WXL) or anisotropic (e.g. 3M 9703), interposed in contact between the connecting track 28 and the first pole 24 to make the electric contact between the connecting track and said second pole.

Preferably the electrically conducting adhesive 33 is placed at a sub-portion of the portion of the tab 27, the sub-portion being at an end portion of the connecting track 28 (FIGS. 2 and 4).

Preferably the portion of tab 27 is fixed to the second face 25 of the accumulator also by means of an electrically insulating adhesive 34, exemplarily having extension over a further sub-portion of the portion of tab, i.e. leaving free an area (exemplarily shown with circular shape) at the end of the connecting track 28 for the application of the conducting adhesive 33. In order to further improve the insulation between the two poles 22 and 24, one or more dielectric material layers (not shown) can be added (e.g. DuPont ME779 ink printed with screen printing technique), for example above and in contact with the connecting track 28 at the part which extends along the side wall 41 and at the attachment line 29.

Preferably the further portion of tab 40 interposed between the portion of tab 27 and the attachment line 29 is fixed to a side wall 41 of each accumulator 14, by means of the same electrically insulating adhesive 34. Preferably the tab 26 is fixed to the second face 25 of the accumulator to tightly enfold the accumulator, for example remaining adherent to the side wall 41 of the accumulator (as shown in FIG. 4) since subjected to a slight tension.

Preferably each accumulator 14 is fixed on the flexible support by means of an electrically conducting adhesive 33 (for example of the same type used for the second pole) interposed in contact between the first pole 22 and the first contact 42. Exemplarily an annular portion of the first face 23 of the accumulator centred in said first contact 42, is fixed to the flexible support 13 by means of the electrically insulating adhesive 34. Exemplarily the electrically insulating adhesive 34 extends with continuity from the first face to the portion of tab 27. In the case of a double-adhesive tape, the insulating adhesive 34 can be previously cut in single piece and then glued to the flexible support.

Preferably the electrically conducting adhesive 33 lies within the annular portion of the first face of the accumulator.

Preferably the electrically insulating adhesive 34 is a pressure sensitive adhesive, for example a double-adhesive tape (e.g. PSA 3M 9469PC), and/or an epoxy adhesive (e.g. Henkel® LOCTITE® 312™).

In an embodiment, the tracks of the electric circuit 18, including the connecting track 28 and the first electric contact 42, are made with a conductive ink (e.g. silver conductive ink DuPont® 5025) directly printed on the flexible substrate, for example using a screen-printing technique.

The electronic unit 11 typically comprises (not shown) at least one sensor for detecting at least one of the following physical quantities: temperature, pressure, acceleration; a processing unit and a transceiver. As an example, the electronic unit can comprise a prefabricated assembled model FXTH870911DT1 marketed by NXP Semiconductors®, comprising a processing unit and a plurality of sensors suitable for detecting all the three physical quantities: temperature, pressure and acceleration. This assembly also includes an RF transceiver with a transceiver frequency of 315-434 MHz. In an exemplary embodiment, it can be used a further transceiver fixed to the flexible support separately from the aforesaid assembly, usable on a different frequency band (for example with Wifi or Bluetooth® technology).

An adhesive layer (not shown), for example pressure sensitive, may be arranged to glue the lower face of the flexible support to the inner surface of the tyre.

Preferably the device 10 is applied on the inner surface 15 so that the equatorial plane 20 of the tyre crosses the monitoring device 10, more preferably it crosses the electronic unit 11 (so that the sensor is at, or next to, the central relief 21 of the tread 17, as shown in FIG. 1).

Preferably the monitoring device comprises a polyurethane film, not shown, applied by lamination to adhere to the face of the device opposite to the inner surface of the tyre.

The invention claimed is:

1. A tyre comprising a monitoring device fixed on an inner surface of the tyre, wherein the monitoring device comprises:
    an electronic unit;
    an electric power supplier comprising a housing body, a first pole at a first face of the housing body, and a second pole at a second face of the housing body, opposite to the first face;
    an electric circuit for connecting the first pole and the second pole to the electronic unit; and
    a single piece flexible support, wherein the electronic unit is fixed,
    wherein the electronic unit comprises: at least one sensor for detecting at least one of the following physical quantities chosen from: temperature, pressure, acceleration, deformation, and combinations thereof; a processing unit; and a transceiver,
    wherein the housing body is fixed onto the flexible support at the first face,
    wherein the monitoring device comprises a tab integral with the flexible support at a first end of the tab and folded wherein a portion of the tab is fixed to the second face of the housing body, and
    wherein the electric circuit comprises an electric connecting track extending along the tab up to electrically contact the second pole.

2. The tyre according to claim 1, wherein the tab forms a single body with the flexible support, and the tab, in plant view, exceeds at least partially an envelope of a perimetral edge of the flexible support, and wherein an attachment line of the tab to the flexible support is arranged in a rearward position with respect to the envelope of the perimetral edge of the flexible support.

3. The tyre according to claim 1, wherein the portion of the tab fixed to the second face of the housing body is a free end portion of the tab.

4. The tyre according to claim 1, wherein the monitoring device comprises an electrically conducting adhesive, interposed between the electric connecting track and the second pole to make the electric contact between the electric connecting track and the second pole and to fix the portion of the tab to the second face of the housing body, and wherein the electrically conducting adhesive is at a sub-portion of the portion of the tab fixed to the second face of the housing body, the sub-portion being at an end portion of the electric connecting track.

5. The tyre according to claim 1, wherein the monitoring device comprises an electrically insulating adhesive for fixing the portion of the tab to the second face of the housing body, and the electrically insulating adhesive extends on a further sub-portion of the portion of the tab.

6. The tyre according to claim 5, wherein the monitoring device comprises a dielectric material layer covering at least a portion of the electric connecting track, and wherein the dielectric material layer is interposed in contact between the portion of the electric connecting track and the electrically insulating adhesive, and the portion of the electric connecting track extends at least at a side wall of the housing body, at a sub-portion of the portion of the tab, or at a combination thereof.

7. The tyre according to claim 1, wherein the monitoring device comprises an electrically insulating adhesive for fixing a further portion of the tab, interposed between the portion of the tab and the first end of the tab, to a side wall of the housing body.

8. The tyre according to claim 1, wherein the tab is fixed to the second face of the housing body to enfold the housing body and remain adherent to a side wall of the housing body.

9. The tyre according to claim 1, wherein the electric circuit comprises at least a first electric path for the connection of the electronic unit to the first pole, and a second electric path for the connection of the electronic unit to the second pole, wherein the electric connecting track belongs to the second electric path, and wherein the electric circuit comprises a first electric contact at, and in contact with, the first pole and belonging to the first electric path.

10. The tyre according to claim 9, wherein the first electric contact has a grid layout.

11. The tyre according to claim 9, wherein the monitoring device comprises an electrically conducting adhesive for fixing the housing body on the flexible support, wherein the electrically conducting adhesive is interposed in contact between the first pole and the first electric contact, wherein the monitoring device further comprises an electrically insulating adhesive for fixing to the flexible support a portion of the first face of the housing body, and wherein the electrically insulating adhesive extends between the first face and the portion of the tab.

12. The tyre according to claim 1, wherein the housing body has a circular plant, and wherein the housing body is inscribed in a circle having diameter less than or equal to 30 mm, or circumscribed to a circle having diameter greater than or equal to 15 mm, or both.

13. The tyre according to claim 1, wherein the tab has an overall length along a main extension line extending for a whole side wall of the housing body and extending for at least 50% of a respective dimension of the second face of the housing body, and wherein the tab has a width along a direction perpendicular to the main extension line greater than or equal to 25% of the respective dimension of the second face, or equal to the respective dimension of the second face.

14. The tyre according to claim 1, wherein the flexible support is fixed to the inner surface of the tyre by an adhesive layer; wherein the flexible support is substantially inextensible; wherein the flexible support is a film of an elastomeric or thermoplastic material chosen from: nylon, PET, PEN, polyimide, EPDM, diene polymers and polyurethane resins or the film is obtained from paper substrates, or thin epoxy resin layers or super-thin and flexible silicon layers or other semiconductor; wherein the electric circuit is printed or deposited onto the flexible support with a conducting ink or the electric circuit comprises conducting tracks including the electrical conducting track, made of copper, obtained by chemical etching of a thin copper layer; and wherein pre-fabricated electronic components are fixed and electrically connected to the electric circuit by gluing with conductive adhesives, or by welding, or by both.

15. The tyre according to claim 1, wherein the housing body is rigid and wherein the electric power supplier comprises at least one accumulator comprising the housing body.

16. The tyre according to claim 15, wherein the accumulator is an electric battery and has a charge capacity greater than or equal to 80 mAh.

17. The tyre according to claim 1, wherein the electric power supplier comprises a plurality of electric energy accumulators, wherein each accumulator is electrically connected to the electronic unit through the electric circuit and suitable for supplying the electronic unit, wherein each of the accumulators comprises a respective housing body, and wherein the accumulators are electrically connected to the electronic unit in parallel.

18. The tyre according to claim 1, wherein the electric power supplier comprises a plurality of housing bodies, and wherein the monitoring device comprises a respective tab for each housing body,
wherein each housing body is fixed onto the flexible support at a respective first face of each housing body,
wherein each respective tab is integral with the flexible support at a first end of the respective tab and folded, wherein a portion of the respective tab is fixed to a second face of the respective housing body, and
wherein the electric circuit comprises, for each respective tab, a respective electric connecting track extending along the respective tab up to electrically contact a respective second pole at the second face of the housing body.

19. The tyre according to claim 1, wherein the monitoring device comprises a polymeric film applied adherently to a face of the monitoring device on the side of the electric power supplier, and wherein the polymeric film covers the face of the monitoring device.

* * * * *